(12) United States Patent
Isogai

(10) Patent No.: US 10,233,614 B2
(45) Date of Patent: Mar. 19, 2019

(54) FLUID PRESSURE CONTROL DEVICE

(71) Applicant: KYB Corporation, Tokyo (JP)

(72) Inventor: Hiroki Isogai, Kanagawa (JP)

(73) Assignee: KYB Corporation, Tokyo (JP)

( * ) Notice: Subject to any disclaimer, the term of this patent is extended or adjusted under 35 U.S.C. 154(b) by 0 days.

(21) Appl. No.: 15/566,617

(22) PCT Filed: Mar. 30, 2016

(86) PCT No.: PCT/JP2016/060490
§ 371 (c)(1),
(2) Date: Oct. 13, 2017

(87) PCT Pub. No.: WO2016/167128
PCT Pub. Date: Oct. 20, 2016

(65) Prior Publication Data
US 2018/0094405 A1    Apr. 5, 2018

(30) Foreign Application Priority Data

Apr. 15, 2015    (JP) ................................ 2015-083063

(51) Int. Cl.
*E02F 9/22* (2006.01)
*F16K 31/122* (2006.01)
(Continued)

(52) U.S. Cl.
CPC .............. *E02F 9/2228* (2013.01); *E02F 9/22* (2013.01); *E02F 9/2239* (2013.01);
(Continued)

(58) Field of Classification Search
CPC ..... E02F 9/2267; E02F 9/2228; E02F 9/2285; E02F 9/2292; E02F 9/2239;
(Continued)

(56) References Cited

U.S. PATENT DOCUMENTS 5,366,202 A * 11/1994 Lunzman ............ F15B 13/0402
137/625.64
7,614,225 B2 * 11/2009 Kim ..................... B62D 11/005
60/421

(Continued)

FOREIGN PATENT DOCUMENTS

EP         0393195 A1    10/1990
EP         0533953 A1     3/1993
(Continued)

*Primary Examiner* — Atif H Chaudry
(74) *Attorney, Agent, or Firm* — Rabin & Berdo, P.C.

(57) ABSTRACT

A fluid pressure control device includes a first circuit system having a first pump and a first control valve. The first circuit system includes an intermediate cut valve provided downstream of the first control valve in a first intermediate passage and which connects and disconnects a connection between the first intermediate passage and the tank, and an external output port communicating at a part downstream of the first control valve in the first intermediate passage and upstream of the intermediate cut valve, the external output port being capable of externally supplying working fluid discharged from the first pump.

3 Claims, 4 Drawing Sheets

(51) Int. Cl.
*F16K 27/00* (2006.01)
*F15B 11/17* (2006.01)
*F15B 11/00* (2006.01)

(52) U.S. Cl.
CPC .......... *E02F 9/2267* (2013.01); *E02F 9/2271* (2013.01); *E02F 9/2292* (2013.01); *F15B 11/00* (2013.01); *F15B 11/17* (2013.01); *F16K 27/003* (2013.01); *F16K 31/1221* (2013.01); *F15B 2211/20576* (2013.01); *F15B 2211/3116* (2013.01); *F15B 2211/329* (2013.01); *F15B 2211/50518* (2013.01); *Y10T 137/86163* (2015.04); *Y10T 137/87877* (2015.04); *Y10T 137/87885* (2015.04)

(58) Field of Classification Search
CPC ............... F16K 31/1221; F16K 27/003; Y10T 137/87877; Y10T 137/87885; Y10T 137/86163; F15B 11/17; F15B 2211/20576
See application file for complete search history.

(56) References Cited

U.S. PATENT DOCUMENTS

| | | | |
|---|---|---|---|
| 2003/0037465 A1* | 2/2003 | Toji | E02F 9/2239 37/348 |
| 2011/0072810 A1* | 3/2011 | Kawasaki | E02F 9/2075 60/429 |

FOREIGN PATENT DOCUMENTS

| | | | |
|---|---|---|---|
| JP | 04312630 A | * | 11/1992 |
| JP | H04-312630 A | | 11/1992 |
| JP | H10-25770 A | | 1/1998 |
| JP | 2002-181008 A | | 6/2002 |
| JP | 3730715 B2 | * | 1/2006 |

\* cited by examiner

FLUID PRESSURE CONTROL DEVICE

TECHNICAL FIELD

The present invention relates to a fluid pressure control device used in work machines.

BACKGROUND ART

JP2002-181008A discloses an invention of a hydraulic control device that installs, in a valve block, a first circuit system constituted of a plurality of spool valves connected to a first pump; and a second circuit system constituted of a plurality of spool valves connected to a second pump. In the hydraulic control device of JP2002-181008A, a joining switching valve is provided, which disconnects the first circuit system from an intermediate passage. By switching this joining switching valve and disconnecting the communication between the intermediate passage and the tank, the first circuit system is joined with an arm switching valve of the second circuit system through a switch passage provided upstream of the joining switching valve.

SUMMARY OF INVENTION

However, in the hydraulic control device of JP2002-181008A, the joining passage is provided inside the valve block. Therefore, working oil from the first circuit system could not be used for purposes other than joining into a certain actuator of the second circuit system.

The present invention is accomplished in view of the above problems, and an object thereof is to provide a fluid pressure control device that can use working oil from the first circuit system for purposes other than joining into a certain actuator in the second circuit system, as appropriate.

According to a certain aspect of the present invention, a fluid pressure control device includes: a first circuit system connected to a first pump and having a first control valve adapted to control a actuator; and a second circuit system connected to a second pump and having a second control valve adapted to control a actuator, the first circuit system having: a first intermediate passage adapted to return the working fluid of the first pump to a tank when the first control valve is in an intermediate position; an intermediate cut valve provided downstream of the first control valve in the first intermediate passage, the intermediate cut valve being adapted to connect and disconnect a connection between the first intermediate passage and the tank; and an external output port connected to a part downstream of the first control valve and upstream of the intermediate cut valve in the first intermediate passage, the external output port being capable of externally supplying working fluid discharged from the first intermediate passage.

DESCRIPTION OF EMBODIMENTS

The following describes a fluid pressure control device 100 according to an embodiment of the present invention with reference to the attached drawings.

Figure 1:
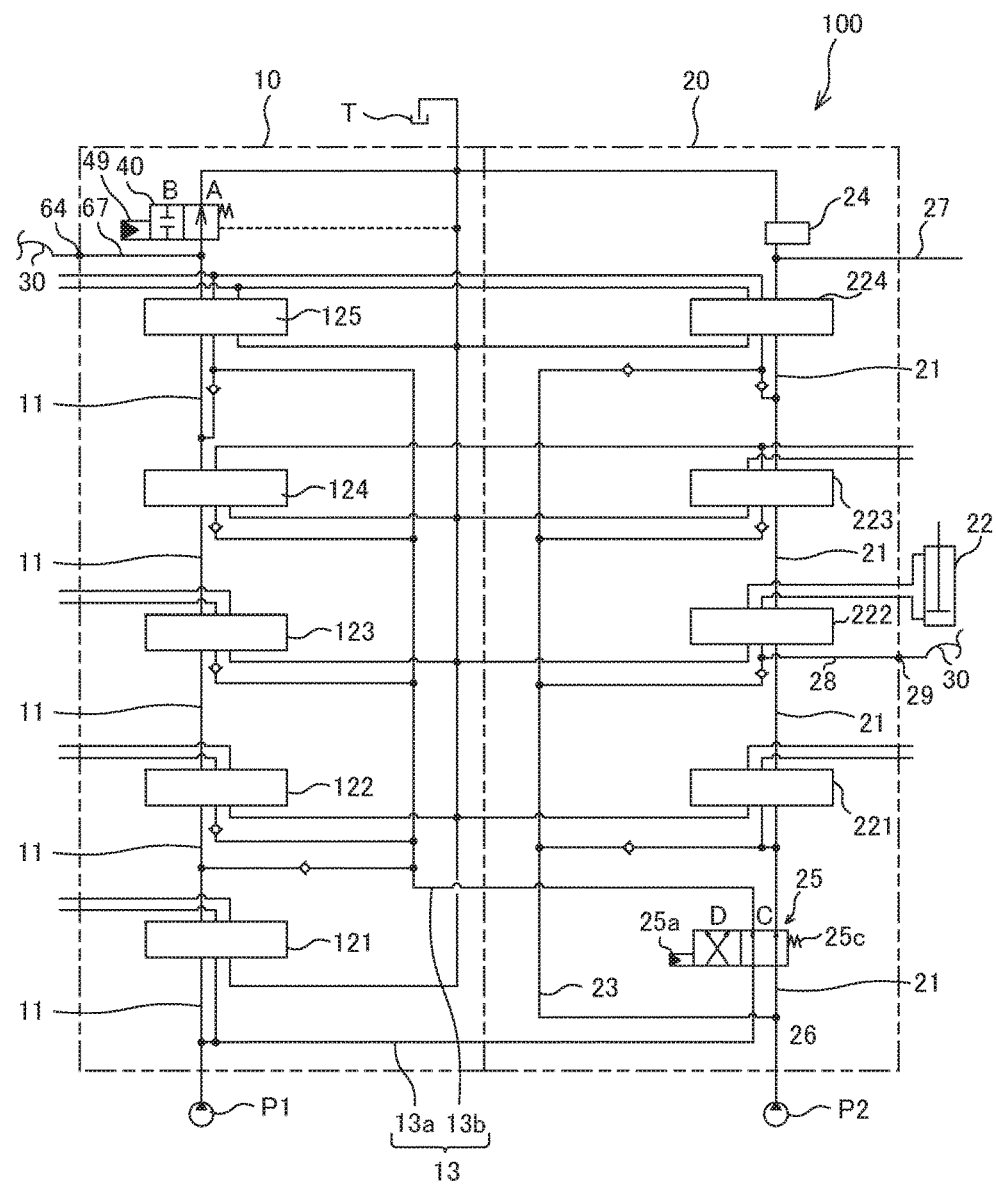
FIG. 1 is a circuit diagram showing a fluid pressure control device according to an embodiment of the present invention.

FIG. 1 is a circuit diagram showing the fluid pressure control device 100 in the present embodiment.

The fluid pressure control device 100 is used in work machines such as a power shovel. In this embodiment, although explanation will be provided for a case in which the work machine is a power shovel, the fluid pressure control device 100 is also applicable to other work machines such as a wheel loader. Moreover, in the fluid pressure control device 100, although working oil is used as the working fluid, other fluids such as working water may be used as the working fluid.

As shown in FIG. 1, the fluid pressure control device 100 includes a first circuit system 10 connected to a first pump P1 from which working oil is supplied, and a second circuit system 20 connected to a second pump P2 from which working oil is supplied.

The first circuit system 10 includes; a first intermediate passage 11 that guides the working oil supplied from the first pump P1 to a tank T; a plurality of control valves 121 to 125 that are connected to the first intermediate passage 11 in series; and a first parallel passage 13 branching from the first intermediate passage 11 at positions upstream of control valves 121 to 125. The control valves 121 to 125 are connected in series by the first intermediate passage 11, and are connected in parallel by the first parallel passage 13.

The working oil discharged from the first pump P1 is guided to, in order from the upstream side, a first traveling control valve 121, an auxiliary control valve 122, a revolving control valve 123, a first boom control valve 124, and a first arm control valve 125. The first traveling control valve 121 controls the supplying and discharging of the working oil to a traveling motor provided on the left side of the vehicle body of a power shovel (not illustrated). The auxiliary control valve 122 controls the supplying and discharging of the working oil to an actuator that drives an attachment such as a breaker or crusher attached instead of the bucket. The revolving control valve 123 controls the supplying and discharging of the working oil to a revolving motor that revolves a revolving body disposed on an upper portion of the vehicle body. The first boom control valve 124 controls the supplying and discharging of the working oil to an actuator that drives the boom. The first arm control valve 125 controls the supplying and discharging of the working oil to an actuator that drives the arm. The control valves 121 to 125 are equivalent to the first control valves.

In the first circuit system 10, when all the control valves 121 to 125 are in their intermediate positions, the working oil supplied from the first pump P1 is returned to the tank T by the first intermediate passage 11. On the other hand, when at least one of the control valves 121 to 125 is in a working position, the connection between the first pump P1 and the tank T in the first intermediate passage 11 is disconnected.

Moreover, in the first circuit system 10, even when one of the control valves 121 to 124 is switched to the working position and the connection between the first pump P1 and the tank T in the first intermediate passage 11 is disconnected, the working oil supplied from the first pump P1 can be supplied to the control valves 122 to 125 via the first parallel passage 13.

The first circuit system 10 further includes an intermediate cut valve 40 that is provided downstream of the control valves 121 to 125 in the first intermediate passage 11 and which connects and disconnects the connection between the first intermediate passage 11 and the tank T. The intermediate cut valve 40 communicates the connection of the first intermediate passage 11 with the tank T when at an A position in FIG. 1 (normal position), and disconnects the connection between the first intermediate passage 11 and the tank T when at a B position (disconnecting position).

The first circuit system 10 further includes a branching passage 67 communicating at a position downstream of the first arm control valve 125 in the first intermediate passage 11 and upstream of the intermediate cut valve 40, being capable of externally supplying the working oil disposed from the first pump P1.

The second circuit system 20 includes: a second intermediate passage 21 that guides the working oil supplied from the second pump P2 to the tank T; a plurality of control valves 221 to 224 that are connected to the second intermediate passage 21 in series; and a second parallel passage 23 branching from the second intermediate passage 21 at positions upstream of control valves 221 to 224. The control valves 221 to 224 are connected in series by the second intermediate passage 21, and are connected in parallel by the second parallel passage 23.

The working oil discharged from the second pump P2 is guided to, in order from the upstream side, a second traveling control valve 221, a bucket control valve 222, a second boom control valve 223, and a second arm control valve 224. The second traveling control valve 221 controls the supplying and discharging of the working oil to a traveling motor provided on the right side of the vehicle body of a power shovel (not illustrated). The bucket control valve 222 controls the supplying and discharging of the working oil to an actuator that drives the bucket. The second boom control valve 223 controls the supplying and discharging of the working oil to an actuator that drives the boom. The second arm control valve 224 controls the supplying and discharging of the working oil to an actuator that drives the arm. The control valves 221 to 224 are equivalent to the second control valves.

In the second circuit system 20, when all the control valves 221 to 224 are in their intermediate positions, the working oil supplied from the second pump P2 is returned to the tank T by the second intermediate passage 21. On the other hand, when at least one of the control valves 221 to 224 is in the working position, the connection between the second pump P2 and the tank T in the second intermediate passage 21 is disconnected.

Moreover, in the second circuit system 20, even when any one of the control valves 221 to 223 is switched to the working position and the connection between the second pump P2 and the tank T in the second intermediate passage 21 is disconnected, the working oil supplied from the second pump P2 can be supplied to the control valves 222 to 224 via the second parallel passage 23.

The second circuit system 20 further includes an external input passage 28 that connects to the second parallel passage 23 at a position upstream of the bucket control valve 222, and an intermediate cut valve 24 that is provided downstream of the second arm control valve 224 on the second intermediate passage 21 and which connects and disconnects the connection between the second intermediate passage 21 and the tank T. The external input passage 28 is formed with an external input port 29 that opens on an outer plane of the fluid pressure control device 100. A structure identical to that of the intermediate cut valve 40 is used for the intermediate cut valve 24.

The second circuit system 20 further includes a branching passage 27 communicating at a position downstream of the second arm control valve 224 in the second intermediate passage 21 and upstream of the intermediate cut valve 24, being capable of externally supplying the working oil discharged from the second pump P2.

The second circuit system 20 further includes a straight travel control valve 25 connected at a position downstream of a branching point with the second parallel passage 23 on the second intermediate passage 21 and upstream of the second traveling control valve 221. The first parallel passage 13 is connected to the straight travel control valve 25. The first parallel passage 13 has: a first parallel upstream passage 13a that connects the first pump P1 with the straight travel control valve 25; and a first parallel downstream passage 13b that connects the straight travel control valve 25 with the control valves 122 to 125.

The straight travel control valve 25 switches between two positions, of a normal position C shown on the right side in FIG. 1, and a straight travel position D shown on the left side in FIG. 1. The straight travel control valve 25 switches to the straight travel position D when working oil is supplied to the pilot chamber 25a. When no pilot pressure is acting on the pilot chamber 25a, the straight travel control valve 25 is maintained at the normal position C by energizing force of a spring 25c.

In the normal position C, the first parallel upstream passage 13a of the first parallel passage 13 is connected to the first parallel downstream passage 13b of the first parallel passage 13, and the second intermediate passage 21 is connected to the second pump P2. This causes the working oil discharged from the first pump P1 to be supplied to the control valves 121 to 125 via the first intermediate passage 11 and the first parallel passage 13. Moreover, the working oil discharged from the second pump P2 is supplied to the control valves 221 to 224 via the second intermediate passage 21 and the second parallel passage 23. That is to say, when just the traveling motor is to be operated, the working oil discharged from the first pump P1 is supplied to the first traveling control valve 121, and the working oil discharged from the second pump P2 is supplied to the second traveling control valve 221.

In the straight travel position D, the first parallel upstream passage 13a of the first parallel passage 13 is connected to the second intermediate passage 21 downstream of the straight travel control valve 25, and the first parallel downstream passage 13b is connected to the second pump P2. That is to say, when the traveling motor and an actuator other than the traveling motor are operated simultaneously, the working oil discharged from the first pump P1 is supplied to the first traveling control valve 121 and the second traveling control valve 221, and the working oil discharged from the second pump P2 is supplied to the other control valves 122 to 125 and other control valves 222 to 224. Accordingly, in the straight travel position D, even if the traveling motor and actuators other than the traveling motor are operated simultaneously, the circuit of the traveling motor and the circuit of the actuators other than the traveling motor are independent from each other, so the straight traveling ability of the vehicle body is secured.

Figure 2:
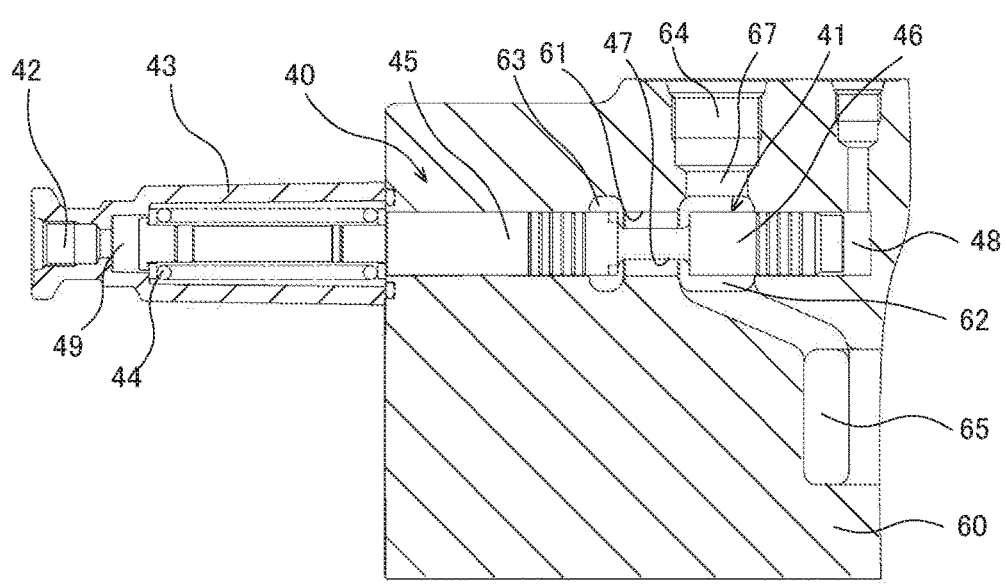
FIG. 2 is a sectional view of an intermediate cut valve in a fluid pressure control valve according to an embodiment of the present invention.

Next, the specific structures of the fluid pressure control device 100 and the intermediate cut valve 40 are described with reference to FIG. 1 and FIG. 2. FIG. 2 is a sectional view showing a cross section when the intermediate cut valve 40 is at the A position (normal position).

The fluid pressure control device 100 stacks a plurality of valve blocks and fastens these by sandwiching with a bolt or like item, to form its main body. The fluid pressure control device 100 may be formed of one valve block.

As shown in FIG. 2, the intermediate cut valve 40 includes: a valve block 60 having a bottomed cylindrical housing hole 61; a spool 41 as a valve body, being housed inside the housing hole 61 to connect and disconnect the connection between the first intermediate passage 11 and the tank T; a drain chamber 48 defined between one end of the spool 41 and the bottom portion of the housing hole 61 and communicating with the tank T; a pilot pressure chamber 49 provided on the other end of the spool 41 and formed by the valve block 60 and a cap member 43; and a return spring 44 provided within the pilot pressure chamber 49 to energize the spool 41 in a direction that the first intermediate passage 11 communicates with the tank T (left direction in FIG. 2). The cap member 43 is provided with a pilot port 42 for supplying and discharging pilot pressure.

The spool 41 includes a first land portion 45 and a second land portion 46 that move slidably along an inner circumferential surface of the housing hole 61, and an annular groove 47 formed between the first land portion 45 and the second land portion 46.

Formed in the valve block 60 are: an inflow portion 65 that communicates with a part downstream of the first arm control valve 125; an inlet port portion 62 formed to the housing hole 61 so as to surround the spool 41, and communicating with the inflow portion 65; and an outlet port portion 63 formed to the housing hole 61 so as to surround the spool 41, and communicating with the tank T. A flow passage from the inflow portion 65 through the inlet port portion 62 and to the outlet port portion 63 within the valve block 60, corresponds to an in-block intermediate passage that constitutes one part downstream of the first arm control valve 125 of the first intermediate passage 11. The valve block 60 further includes a branching passage 67 that branches from the inlet port portion 62 and externally guides the working oil discharged from the first pump P1. The branching passage 67 has formed an external output port 64 that opens on an outer plane of the valve block 60. The external output port 64 is formed with a screw portion for connecting pipes.

Next describes operations of the intermediate cut valve 40.

The intermediate cut valve 40, in a state in which no working oil is supplied into the pilot pressure chamber 49, has the spool 41 in a state as shown in FIG. 2, that is to say, positioned at the A position in FIG. 1 (normal position). In this state, the inlet port portion 62 communicates with the outlet port portion 63 via the annular groove 47 formed on the spool 41. Accordingly, the working oil flowing into the inlet port portion 62 from the inflow portion 65 that communicates with a part downstream of the first arm control valve 125 in the first intermediate passage 11 is returned into the tank T via the annular groove 47 and the outlet port portion 63. That is to say, by switching the intermediate cut valve 40 to the A position (normal position), the first intermediate passage 11 communicates with the tank T.

When the working oil is supplied to the pilot pressure chamber 49 from this state, the spool 41 moves towards the right side in FIG. 2 against the energizing force by the return spring 44, due to the pressure of the working oil supplied to the pilot pressure chamber 49. This causes the inlet port portion 62 and the outlet port portion 63 to be disconnected by the first land portion 45 of the spool 41. That is to say, the intermediate cut valve 40 switches to the B position (disconnecting position) in FIG. 1. Accordingly, the working oil flowing into the inlet port portion 62 from the inflow portion 65 that communicates with a part downstream of the first arm control valve 125 in the first intermediate passage 11 is prevented from flowing into the outlet port portion 63, by the first land portion 45. That is to say, by switching the intermediate cut valve 40 to the B position (disconnecting position), the connection between the first intermediate passage 11 and the tank T is disconnected.

The external output port 64 constantly communicates with the inflow portion 65 via the inlet port portion 62. However, in the state in which the intermediate cut valve 40 is positioned at the A position (normal position), the inlet port portion 62 communicates with the tank T as described above; accordingly, the external output port 64 also communicates with the tank T via the inlet port portion 62. This causes the working oil discharged by the first pump P1 to be returned to the tank T without being supplied to the external output port 64. In comparison, in the state in which the intermediate cut valve 40 is positioned at the B position (blocking position), the connection between the inlet port portion 62 and the tank T is disconnected as described above. Accordingly, the working oil flowing in from the inlet port portion 62 is supplied by its whole amount outside the valve block 60, via the branching passage 67 and the external output port 64.

As such, in the fluid pressure control device 100, by switching the intermediate cut valve 40 to the B position (disconnecting position), the working oil discharged from the first pump P1 to the first circuit system 10 can be supplied externally via the external output port 64. Therefore, in the fluid pressure control device 100, the working oil discharged from the first pump P1 to the first circuit system 10 can be, for example, joined into a circuit that drives one of the actuators, via the external output port 64, or can be used for driving a newly added actuator.

Described here is a case in which, for example, the working oil supplied externally via the external output port 64 is joined into a flow passage of a cylinder 22 that drives the bucket.

First, the external output port 64 and an external input port 29 are connected by a pipe 30, outside the valve block 60 (see FIG. 1). In this state, working oil is supplied to a pilot pressure chamber of the bucket control valve 222 that controls the supplying and discharging of the working oil to the cylinder 22, and to the pilot pressure chamber 49 of the intermediate cut valve 40. Accordingly, when the bucket control valve 222 is operated, the bucket control valve 222 is supplied with, in addition to the working oil discharged from the second pump P2, the working oil discharged from the first pump P1 via the external output port 64, pipe 30, external input port 29, and external input passage 28. That is to say, the working oil discharged from the first pump P1 via the external output port 64 joins at a part upstream of the bucket control valve 222 via the external input port 29. As such, the working oil supplied externally via the external output port 64 can be joined into a circuit that drives another actuator.

The intermediate cut valve 40 may be configured to connect and disconnect the connection between the first intermediate passage 11 and the tank T, in accordance with a pilot pressure Pp that controls the bucket control valve 222. In this case, a spring load of a return spring 44 may be set so that in a state in which the pilot pressure Pp is low, the spool 41 of the intermediate cut valve 40 is maintained in a state communicating the connection between the first intermediate passage 11 and the tank T, and in a state in which the pilot pressure Pp is high, the intermediate cut valve 40 switches to a state disconnecting the first intermediate passage 11 from the tank T. According to this configuration, when the operated amount of the bucket control valve 222 is small, the cylinder 22 is driven just by the working oil discharged from the second pump P2, and when the operated amount of the bucket control valve 222 is large, the cylinder 22 is driven by the working oil discharged from the first pump P1, in addition to the working oil discharged from the second pump P2. Therefore, the bucket can be driven at high speed by increasing the operated amount of the bucket control valve 222.

In order to use for driving an actuator to be newly added, the intermediate cut valve 40 is simply switched to the B position (disconnecting position).

In the fluid pressure control device 100, even when the external output port 64 and the external input port 29 are blocked by a plug 50 (see FIG. 3 and FIG. 4), that is, when the external output port 64 and the external input port 29 are not connected via the pipe 30, by changing the straight travel control valve 25, the working oil discharged from the first pump P1 can be made to join with the working oil discharged from the second pump P2 and be supplied to the cylinder 22 that drives the bucket. The following describes a modification of the fluid pressure control device 100 with reference to FIG. 3 and FIG. 4.

Figure 3:
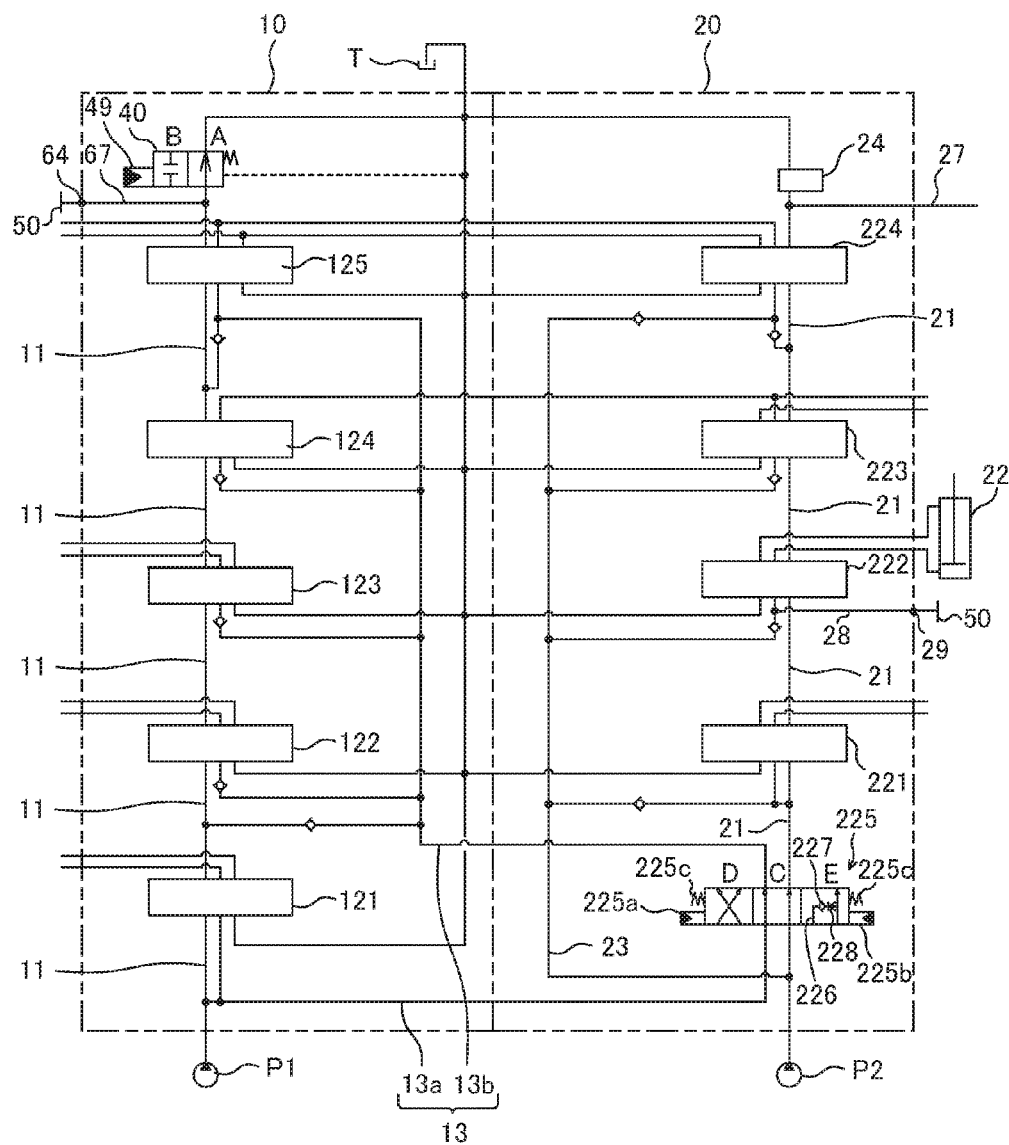
FIG. 3 is a circuit diagram showing a modification of a fluid pressure control device according to an embodiment of the present invention.
Figure 4:
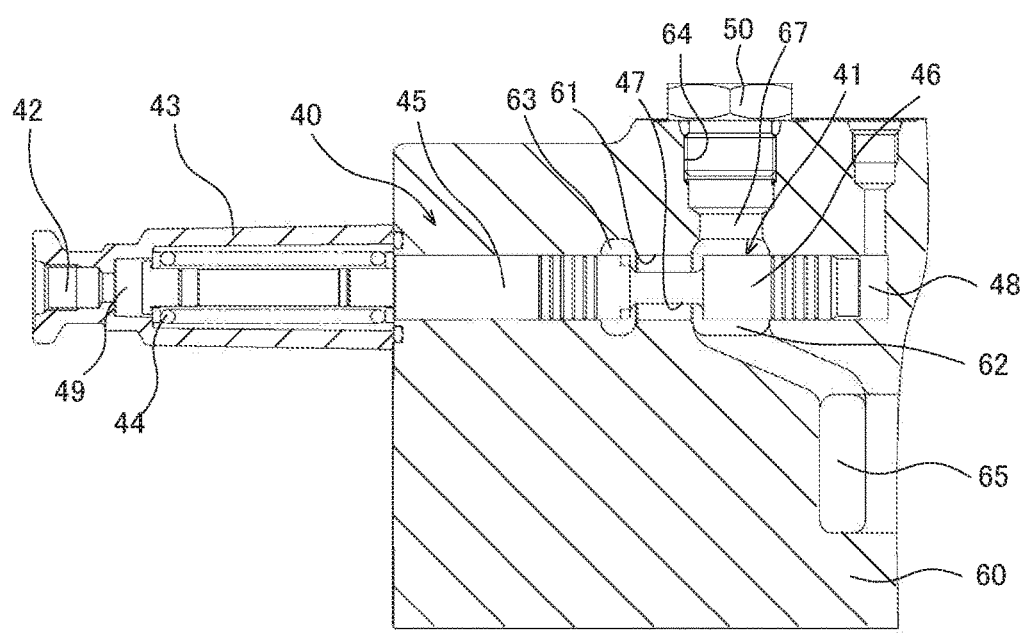
FIG. 4 is a sectional view showing an intermediate cut valve in a modification of a fluid pressure control device according to an embodiment of the present invention.

The fluid pressure control device shown in FIG. 3 and FIG. 4 differs from the fluid pressure control device 100 shown in FIG. 1 in points where the external output port 64 and the external input port 29 are blocked by the plug 50, and where the straight travel control valve 225 can be switched between three positions, of a normal position C, a straight travel position D shown on the left side in FIG. 3, and a joining position E shown on the right side in FIG. 3.

The positions C, D, E of the straight travel control valve 225 are switched in accordance with a pilot pressure supplied to the pilot chambers 225a and 225b provided on either end of the straight travel control valve 225. When the pilot pressure is acting on neither of the pilot chambers 225a or 225b, the straight travel control valve 225 becomes in the normal position C by the energizing force of springs 225c provided on either side of the straight travel control valve 225. When the pilot pressure is supplied to the pilot chamber 225a, the straight travel control valve 225 switches to the straight travel position D, and when the pilot pressure is supplied to the pilot chamber 225b, the straight travel control valve 225 switches to the joining position E. The normal position C and the straight travel position D in the straight travel control valve 225 function similarly to those of the straight travel control valve 25, so descriptions thereof are omitted.

In the joining position E in the straight travel control valve 225, the second intermediate passage 21 upstream of the straight travel control valve 225 is connected to the second intermediate passage 21 downstream thereof, and the first parallel upstream passage 13a is connected to the second intermediate passage 21 via a joining passage 226 formed inside the straight travel control valve 225. This causes the working oil of the first pump P1 to join with the working oil of the second pump P2 and be supplied to the second control valves, and allows for supplying more working oil, by the actuator connected to the second control valves.

The joining passage 226 formed inside the straight travel control valve 225 is provided with, from its upstream side in this order, a check valve 227 that allows just a flow from the first parallel upstream passage 13a to the second intermediate passage 21, and a throttle 228 that restricts the flow of the working oil within the joining passage 226. This allows for preventing the working oil of the second pump P2 from flowing to the first parallel upstream passage 13a side, and by restricting the working oil of the first parallel upstream passage 13a, allows for joining to the second intermediate passage 21 by adjusting a joining amount from the first pump P1 to the second pump P2 at a combined operation of the first control valve with the second control valve.

Here described is a case in which, for example, the working oil discharged from the first pump P1 is joined into the second intermediate passage 21 while driving the cylinder 22 that drives the bucket.

The working oil is supplied to: a pilot pressure chamber of the bucket control valve 222 that controls the supplying and discharging of the working oil to the cylinder 22 driving the bucket; the pilot pressure chamber 49 of the intermediate cut valve 40; and the pilot chamber 225b of the straight travel control valve 225. Accordingly, when the bucket control valve 222 is operated, the second intermediate passage 21 and the second parallel passage 23 are supplied with the working oil discharged from the first pump P1 via the joining passage 226 of the straight travel control valve 225, in addition to the working oil discharged from the second pump P2. Accordingly, the cylinder 22 is driven in a state in which the working oil discharged from the first pump P1 is joined with the working oil discharged from the second pump P2. Therefore, compared to the case of driving just by the working oil discharged from the second pump P2, the bucket can be driven at high speed.

As such, in the fluid pressure control device 100, even in the case of using upon blocking the external output port 64, just by changing the straight travel control valve 25 to the straight travel control valve 225, the working oil discharged from the first pump P1 to the first circuit system 10 can be joined to the second circuit system 20. The fluid pressure control device 100 can include the straight travel control valve 225 in advance. In this case, by not using the joining position E in the straight travel control valve 225, this will carry the same functions as the circuit shown in FIG. 1. Therefore, this allows for joining the working oil discharged from outside from the first pump P1 to the first circuit system 10, to the second circuit system 20 by using the external output port 64.

According to the above embodiment, the following effects are achieved.

In the fluid pressure control device 100, the working oil discharged from the first pump P1 to the first intermediate passage 11 of the first circuit system 10 can be taken out externally via the external output port 64. Where the pipe is connected from the external output port 64 can be changed as appropriate. This allows for appropriately using the working oil from the first circuit system 10 for purposes other than joining to a certain actuator of the second circuit system 20.

Moreover, in the fluid pressure control device 100, an external output port 64 is formed to the valve block 60 of the intermediate cut valve 40. No cylinder port exists in the valve block 60 of the intermediate cut valve 40. Therefore, this allows for easily securing a space to provide the external output port 64, and allows for easily carrying out the piping work of the external output port 64. Moreover, compared to a case of forming a passage extending from the intermediate cut valve 40 to the external output port 64 through a plurality of valve blocks, no sealing parts is required and the amount of processes required can be reduced.

In the fluid pressure control device 100, the external output port 64 communicates with the inflow portion 65 via an inlet port portion 62 formed surrounding the spool 41 in the housing hole 61 of the valve block 60. As such, since one part of the housing hole 61 is used as a communication passage for communicating the external output port 64 with the inflow portion 65, there is no need to separately provide this communication passage from the housing hole 61, and can reduce the size of the valve block 60.

Description is made collectively for the configuration, functions, and effects of the embodiment of the present invention configured as described above.

The fluid pressure control device 100 includes: a first circuit system 10 having a first control valve (first traveling control valve 121, auxiliary control valve 122, revolving control valve 123, first boom control valve 124, first arm control valve 125) connected to the first pump P1 and which controls an actuator; and a second circuit system 20 having a second control valve (second traveling control valve 221, bucket control valve 222, second boom control valve 223, second arm control valve 224) connected to the second pump P2 and which controls an actuator. The first circuit system 10 has: a first intermediate passage 11 that returns working fluid of the first pump P1 to the tank T when the first control valve (first traveling control valve 121, auxiliary control valve 122, revolving control valve 123, first boom control valve 124, first arm control valve 125) is at the intermediate position; an intermediate cut valve 40 provided downstream of the first control valve (first traveling control valve 121, auxiliary control valve 122, revolving control valve 123, first boom control valve 124, first arm control valve 125) in the first intermediate passage 11 and which connects and disconnects a connection between the first intermediate passage 11 and the tank T; and an external output port 64 communicating at a part downstream of the first control valve (first traveling control valve 121, auxiliary control valve 122, revolving control valve 123, first boom control valve 124, first arm control valve 125) in the first intermediate passage 11 and upstream of the intermediate cut valve 40, allowing for externally supplying working fluid discharged from the first pump P1.

In this configuration, the working oil discharged from the first pump P1 can be taken out externally via the external output port 64.

Moreover, in the fluid pressure control device 100, the intermediate cut valve 40 includes a valve block 60 having a housing hole 61, and a valve body (spool 41) housed in the housing hole 61, to connect and disconnect the connection between the first intermediate passage 11 and the tank T. The external output port 64 is formed in the valve block 60 of the intermediate cut valve 40.

In this configuration, the external output port 64 is formed in the valve block 60 of the intermediate cut valve 40. No cylinder port exists in the valve block 60 of the intermediate cut valve 40. Therefore, this allows for easily securing a space for providing the external output port 64, and allows for easily carrying out the piping work of the external output port 64.

Moreover, in the fluid pressure control device 100, the external output port 64 communicates with a part downstream of the first control valve (first arm control valve 125) via the housing hole 61.

In this configuration, the housing hole 61 can be used as a communication path for communicating the external output port 64 with a part downstream of the first control valve (first arm control valve 125). Therefore, this requires no communication path to communicate the external output port 64 with the part downstream of the first control valve (first arm control valve 125) separately to the housing hole 61, and can reduce the size of the valve block 60.

Moreover, in the fluid pressure control device 100, an in-block intermediate passage (a passage from the inflow portion 65 to the outlet port portion 63 via the inlet port portion 62) which communicates with a part downstream of the first control valve (first arm control valve 125) is formed in the valve block 60 and constitutes one part of the first intermediate passage 11. The external output port 64 communicates with the in-block intermediate passage (the passage from the inflow portion 65 to the outlet port portion 63 via the inlet port portion 62).

In this configuration, the external output port 64 can be formed easily, just by providing a hole that communicates with the in-block intermediate passage formed in the valve block 60 (the passage from the flow-in portion 65 to the outlet port portion 63 via the inlet port portion 62).

Moreover, in the fluid pressure control device 100, the second circuit system 20 has an external input port 29 that makes working fluid discharged from the first pump P1 via the external output port 64 join a part upstream of the second control valve (bucket control valve 222, second boom control valve 223, second arm control valve 224).

In this configuration, by providing the external input port 29, the working fluid discharged from the first pump P1 via the external output port 64 can be joined from outside to a part upstream of the second control valve (bucket control valve 222, second boom control valve 223, second arm control valve 224).

Moreover, in the fluid pressure control device 100, the intermediate cut valve 40 connects and disconnects the connection between the first intermediate passage 11 and the tank T in accordance with a pilot pressure Pp that controls the second control valve (bucket control valve 222, second boom control valve 223, second arm control valve 224).

In this configuration, the intermediate cut valve 40 can be controlled in accordance with a pilot pressure Pp that controls the second control valve (bucket control valve 222, second boom control valve 223, second arm control valve 224). Therefore, the intermediate cut valve 40 can be controlled in accordance with the second control valve (bucket control valve 222, second boom control valve 223, second arm control valve 224).

Embodiments of this invention were described above, but the above embodiments are merely examples of applications of this invention, and the technical scope of this invention is not limited to the specific constitutions of the above embodiments.

For example, at least one of the control valves 121 to 125 and control valves 221 to 224 are each provided. Moreover, the working oil from the second circuit system 20 may be joined into the first circuit system 10 by using the intermediate cut valve 24.

The external input passage 28 may be provided to communicate with a part upstream of the second boom control valve 223 or the second arm control valve 224. Moreover, the external output port 64 may be communicated with the first intermediate passage at any portion as long as it is downstream of the first arm control valve 125 and upstream of the spool 41. For example, this may be a configuration in which the branching passage 67 and the external output port 64 are formed in parallel to the housing hole 61 in the valve block, and communicated with the inflow portion 65.

This application claims priority based on Japanese Patent Application No. 2015-83063 filed with the Japan Patent Office on Apr. 15, 2015, the entire contents of which are incorporated into this specification.

The invention claimed is:

1. A fluid pressure control device adapted to control a first actuator and a second actuator driven by working fluid supplied from a first pump and a second pump, comprising:
   a first circuit system connected to the first pump and having a first control valve adapted to control the first actuator; and
   a second circuit system connected to the second pump and having a second control valve adapted to control the second actuator,
   the first circuit system having:
   a first intermediate passage adapted to return the working fluid of the first pump to a tank when the first control valve is in an intermediate position;
   an intermediate cut valve provided downstream of the first control valve in the first intermediate passage, the intermediate cut valve being adapted to connect and disconnect a connection between the first intermediate passage and the tank; and
   an external output port connected to a part downstream of the first control valve and upstream of the intermediate cut valve in the first intermediate passage, the external output port being capable of supplying working fluid discharged from the first intermediate passage to a device other than the first actuator, wherein
   the intermediate cut valve includes:
   a valve block having a housing hole; and
   a valve body housed in the housing hole, the valve body being adapted to connect and disconnect the connection between the first intermediate passage and the tank,
   the valve body includes a first land portion and a second land portion that move slidably along an inner circumferential surface of the housing hole, and an annular groove formed between the first land portion and the second land portion,
   the first land portion is configured to connect and disconnect the connection between the first intermediate passage and the tank,
   the housing hole constitutes one part of the first intermediate passage in the valve block, and
   the external output port is connected to a branching passage which branches from the first intermediate passage in the housing hole.

2. The fluid pressure control device according to claim 1, wherein
   the second circuit system has an external input port adapted to make working fluid discharged from the first pump via the external output port join at a part upstream of the second control valve.

3. The fluid pressure control device according to claim 1, wherein
   the intermediate cut valve connects and disconnects a connection between the first intermediate passage and the tank in accordance with a pilot pressure adapted to control the second control valve.

* * * * *